Dec. 24, 1968   B. PARKER ET AL   3,417,627
FREE-ROTOR GYRO
Filed March 17, 1966

BERNARD PARKER
LEON WEISBORD
  INVENTORS

BY *Thomas W. Kennedy*
     ATTORNEY

United States Patent Office 3,417,627
Patented Dec. 24, 1968

3,417,627
FREE-ROTOR GYRO
Bernard Parker, Teaneck, N.J., and Leon Weisbord, New York, N.Y., assignors to General Precision Inc., Little Falls, N.J., a corporation of Delaware
Filed Mar. 17, 1966, Ser. No. 535,191
4 Claims. (Cl. 74—5.6)

ABSTRACT OF THE DISCLOSURE

Arrangement for minimizing the quadrature-type null-seeking error torque produced by casing axis on a free rotor gyro using a twin-stack drive with the pair of stacks axially spaced about the casing axis and having a pair of coil windings respectively wound thereon to provide a corrective torque substantially equal and opposite to the error torque.

---

The present invention relates to free-rotor gyros, and particularly to a free-rotor gyro drive.

A conventional free-rotor gyro includes a casing with a casing axis, a rotor supported therefrom with a spin axis intersecting said casing axis at a pivot point forming a tilt angle therebetween, a universal-joint bearing interconnecting said rotor and said support for tilting and rotation of said rotor relative thereto, and a drive means mounted on said casing and providing a drive torque on said rotor acting about said casing axis.

One problem with said conventional free-rotor gyro is that it has an inherent quadrature-type null-seeking error torque acting about an axis normal to said spin axis at said pivot point due to said drive torque acting about said casing axis and due to rotor windage effects and due to rotor suspension effects.

In accordance with one embodiment of the present invention, such error torque can be substantially minimized by using a twin-stack drive with its pair of stacks being axially spaced along said casing axis and having a pair of coil windings respectively wound thereon, which provide a corrective torque that is substantially equal and opposite to said error torque.

Accordingly, it is one object of the present invention to provide a free-rotor gyro, in which inherent positive quadrature-type null-seeking error torque on said rotor is minimized.

It is another object of the invention to provide a free-rotor gyro according to the aforementioned object, which has a case-mounted drive means that provides a negative quadrature-type corrective torque on said rotor.

To the fulfillment of these and other objects, the invention provides a free-rotor gyro comprising a support with a longitudinal axis, a rotor rotatable relative thereto and having a spin axis substantially intersecting said support axis at a pivot point forming a tilt angle therebetween, a universal-joint bearing interconnecting said rotor and said support, and a twin-stack drive having a coil assembly and having a pair of laminated stacks supporting said coil assembly and surrounding said rotor and being mounted on said support and axially spaced along said support axis for torquing said rotor about said spin axis and for counteracting error torques about axes in quadrature therewith.

Other objects of the invention will become apparent upon reading the following description and the accompanying drawings, wherein like parts are designated by like numerals throughout the several views and wherein.

Figure 1:
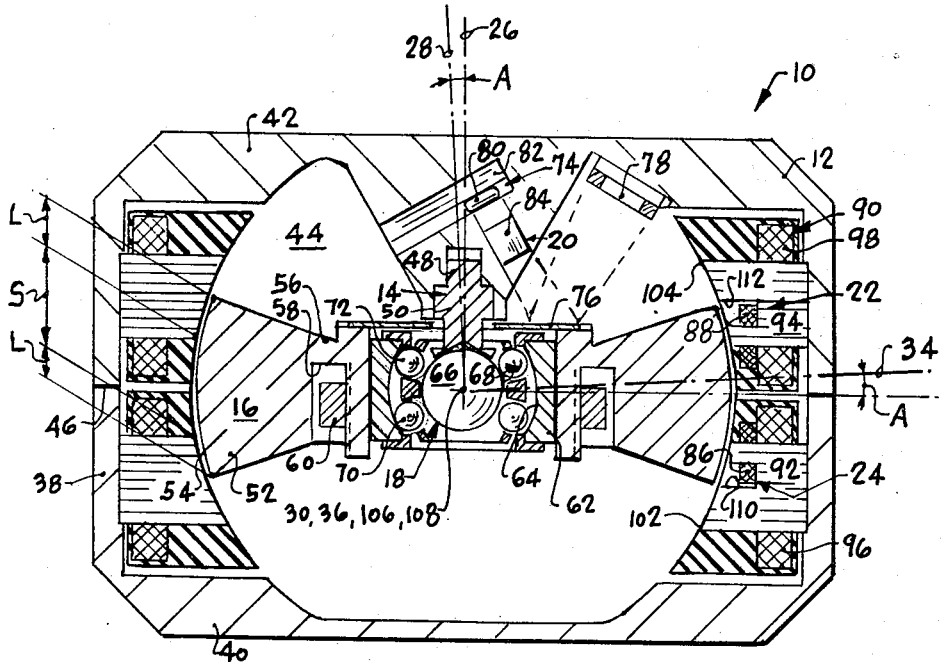
FIGURE 1 is a sectional view of a free-rotor gyro embodying features of the present invention.

Referring to FIGURE 1, one embodiment of the present invention is a free-rotor gyro 10.

Gyro 10 includes a casing 12 with a shaft 14, a rotor 16 with a bearing 18 journaled on said shaft 14, a pick-off 20 for sensing the angle of direction of tilt of said rotor 16, a torquer 22 for returning rotor 16 to null position, and a drive 24 for spinning rotor 16.

Casing 12, which supports rotor 16, has a longitudinal casing Z-axis 26. Rotor 16 has a spin axis 28, which intersects said axis 26 at a pivot point 30, and which forms an angle of tilt A therebetween. Tilt angle A substantially measures 0 at gyro null position. Rotor 16 also has an X-axis 34, which intersects Z-axis 26 at pivot point 30 substantially at right angles thereto, and has a Y-axis 36, which intersects axes 34, 26 at pivot 30 substantially at right angles to a plane including said axes 34, 26.

Casing 12 includes a peripheral wall 38, which is symmetrically disposed about axis 26, and a pair of axially-spaced end walls 40, 42, which together form a cavity 44 in which rotor 16 is disposed. Peripheral wall 38 has an annular construction joint 46 for ease of assembly.

Shaft 14, which is co-axial with casing 12 along axis 26 has an axially outer end 48, which is fixedly connected to wall 42, and has an axially inner end 50, which is fixedly connected to bearing 18.

Rotor 16 has a rim portion 52, which has a radially outer face 54 that has a spherical shape and is symmetrical about axis 28. Rotor 16 also has hub portion 56, which is fixedly connected to bearing 18. Hub 56 has an annular groove 58, which faces axially outwardly and hub 56 has a balancing nut 60, which is received in groove 58 for adjusting the mass unbalance of rotor 16. Rotor 16 is preferably composed of a non-magnetic material to avoid gyro cross-axis coupling.

Bearing 18 has an outer race 62, which is fixedly connected to hub 56 and which has a radially inner surface 64 that is concentric about axis 28. Bearing 18 also has an inner sphere 66, which has a radially outer surface 68 that is concentric about axis 26. Bearing 18 also has 2 sets of bearing balls 70, 72, which are disposed between surface 64 and surface 68, and which are concentric about spin axis 28.

Pick-off 20, which is preferably a two-axis type of optical pick-off, includes a light source 74, which is mounted on wall 42, a reflector 76, such as a mirror or the like, which is mounted on rotor 16, and a light activated sensor 78, such as a potentiometer or the like, which is also mounted on wall 42. Light source 74 has a light emitter 80, a reflector 82 and a fiber-optics unit 84.

Torquer 22 has a lower torquer coil 86 for counter-clockwise rotation of rotor 16 about axis 36, and has an upper torquer coil 88, which is disposed adjacent to coil 86 and which is axially spaced therefrom on the opposite side of pivot 30 for clockwise rotation of rotor 16 about axis 36. Torquer 22 also has a second pair of coils (not shown), which are peripherally spaced at 90° from coils 86, 88, for torquing rotor 16 about axis 34.

Drive 24 includes a coil 90 and a pair of laminated stacks 92, 94, which are mounted on wall 38, which support coil 90, which surround rotor 16, which are axially spaced along axis 26 and which are disposed on axially opposite sides of pivot 30.

Figure 2:
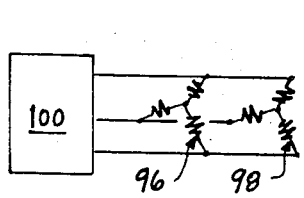
FIGURE 2 is a schematic circuit diagram.

Coil 90 includes a pair of coil windings 96, 98, which are respectively wound and assembled on stacks 92, 94 and which are substantially similar to each other in shape and structure. Coil windings 96, 98, which are preferably three-phase type coils, are connected in parallel to a three-phase variable-frequency variable-voltage power supply 100 (FIGURE 2).

Stacks 92, 94, which are substantially similar to each other in shape and structure, have respective radially inner faces 102, 104 of spherical shape, which have respective spherical centers 106, 108 that substantially coincide with pivot point 30. Stacks 92, 94 are separated by a clear spacing S (FIGURE 1). Faces 102, 104 are both overlapped by rotor face 54 by an axial overlap length L (FIGURE 1), which is substantially the same length at each end thereof at gyro null condition. Faces 102, 104 respectively have a pair of lower and upper ring-shaped grooves 110, 112, which receive said first pair of torquer coils 86, 88. Faces 102, 104 also have a similar pair of grooves (not shown), which are peripherally spaced 90° therefrom for receiving said second pair of torquer coils (not shown).

With this construction, drive 24 provides a torque about Z-axis 26 for spinning rotor 16. In addition, drive 24 provides a negative corrective torque Tc (FIGURES 1, 3), which acts about X-axis 34 and which precesses rotor 16 about Y-axis 36. Said corrective torque Tc counteracts an oppositely-directed re-erecting null-seeking quadrature error torque Te (FIGURES 1, 3), which also acts about X-axis 34 and which precesses about Y-axis 36. Said error torque Te is normaly caused by rotor windage effects, rotor drive torque and rotor suspension effects. Thus, the gyro quadrature error normally caused by said error torque Te is minimized.

Test results and analytical calculations on one sample of one model of embodiment 10 demonstrate that the ratio of said corrective torque. Tc divided by said tilt angle A varies with the ratio of said axial spacing S divided by said axial lap L. Said test results and analytical calculations also demonstrate that said corrective torque Tc substantially varies with said tilt angle A according to the following formula:

$$Tc = (K)(S/L)(A)$$

where:

$K$=a constant.
$S$=the spacing between said pair of stacks 92, 94.
$L$=overlapped dimension of rotor 16 over each stack 92 or 94 at gyro null condition.
$A$=tilt angle of rotor 16.

Figure 3:
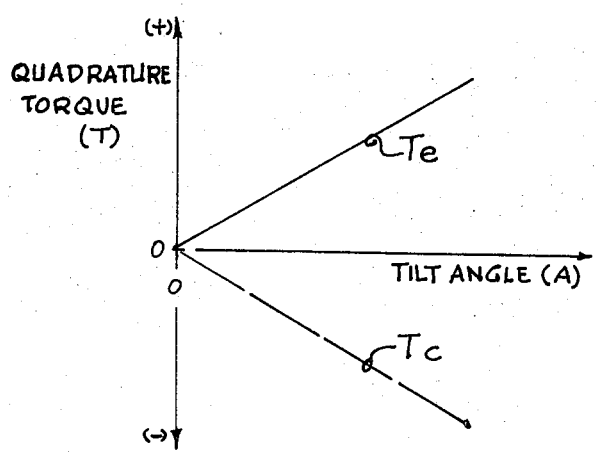
FIGURE 3 is a curve of quadrature torque versus tilt angle.

FIGURE 3 shows a curve representing said positive null-seeking quardature-error torque. Te versus tilt angle A for one model of one embodiment of gyro 10, and also shows a second curve representing said counterbalancing negative corrective torque Tc for said model of gyro 10. With the construction of gyro 10, said curve of corrective torque Tc can be varied by adjusting the $S/L$ ratio. In addition, with such construction, drive 24 can be further calibrated and corrective torque Tc can be further varied by adjusting either the voltage or the frequency of power supply 100.

In summary, this invention provides a free-rotor gyro in which inherent positive quadrature-type null-seeking error torque on said rotor is minimized, and which has a case-mounted drive means that provides a negative quadrature-type corrective torque on said rotor.

While the present invention has been described in a preferred embodiment it will be obvious to those skilled in the art that various modifications can be made therein within the scope of the invention. It is intended that the appended claims cover all such modifications.

What is claimed is:
1. A free-rotor gyro comprising:
a support with a longitudinal support axis;
a rotor rotatable relative thereto and having a spin axis substantially intersecting said support axis and a pivot point forming a tilt angle therebetween; a universal-joint interconnecting said rotor and said support; a twin-stack drive having a coil assembly and having a pair of laminated stacks supporting said coil assembly surrounding said rotor, mounted on said support and axially spaced along said support axis for torquing said rotor about said spin axis and for counteracting error torques about axes in quadrature therewith, said coil assembly including a pair of coil windings respectively mounted and wound on said pair of stacks and axially spaced on opposite sides of said pivot point, said pair of stacks and coil windings being substantially similar in shape and in structure and said pair of stacks having respective radial inner faces of spherical shape with respective spherical centers substantially coinciding with said pivot point, said pair of stacks further having an axial spacing therebetween, and are overlapped relative to said rotor, so that the length of said spacing divided by the length of the overlap determines the amount of corrective torque for any value of tilt angle; a variable frequency variable-voltage power supply connected in parallel to said coil assembly; and, a torque means mounted on said stacks, first and second pairs of torquer coils respectively mounted on the one and the other of said stacks whereby said corrective torque can be varied by adjusting either the voltage or frequency of said power supply.

2. A gyro as claimed in claim 1, said variable-frequency variable-voltage power supply being connected in parallel to said coil assembly.

3. A gyro as claimed in claim 1, including an optical pick-off means having a light emitter and a light sensor mounted on said support and having a reflector mounted on said rotor for sensing said rotor tilt and for minimizing the amount of said corrective torque that is required to counteract said error torque.

4. A gyro as claimed in claim 3, in which:
said support has a casing having a peripheral wall with a casing axis and having a pair of axially spaced end walls forming together a cavity in which said rotor is disposed and having a shaft coaxial therewith for supporting said rotor;
said rotor having a rim portion with a radially outer face and having a hub portion with an annular groove facing axially outwardly and with a balancing nut received in said groove;
said universal-joint bearing having an outer race fixedly connected to said hub with radially inner surface concentric about the rotor spin axis and having an inner sphere with a radially outer surface concentric about said casing axis and having two sets of bearing balls disposed between said surfaces;
said drive coil assembly includes a pair of coil windings respectively mounted and wound on said pair of stacks;
said pair of stacks have respective radially inner faces of spherical shape with respective spherical centers substantially coinciding with said pivot point; and
said pair of stacks have an axial spacing therebetween and said pair of stacks are overlapped by said rotor, wherein the length of said spacing divided by the length of said overlap determines the amount of said corrective torque on said rotor for each value of said rotor tilt angle.

References Cited
UNITED STATES PATENTS

| | | | |
|---|---|---|---|
| 2,731,836 | 1/1956 | Wendt | 74—5.46 X |
| 2,815,584 | 12/1957 | Watson | 74—5.6 X |
| 2,847,664 | 8/1958 | Lewis | 74—5.6 X |
| 2,948,155 | 8/1960 | Burkam | 74—5.6 |
| 3,093,787 | 6/1963 | Taylor | 321—61 |
| 3,107,540 | 10/1963 | Curriston | 74—5.46 X |
| 3,242,745 | 3/1966 | Romberg | 74—5.46 |
| 3,277,304 | 10/1966 | Vyce | 74—5.6 X |
| 3,311,326 | 3/1967 | Scotto et al. | 74—5.6 X |

FRED C. MATTERN, JR., *Primary Examiner.*

F. D. SHOEMAKER, *Assistant Examiner.*